United States Patent [19]

Thompson

[11] Patent Number: 4,486,456

[45] Date of Patent: Dec. 4, 1984

[54] SODIUM-REDUCED BAKED DOUGH PRODUCTS AND METHOD

[76] Inventor: Jerome B. Thompson, P.O. Box 231 - Rte. 3, Cumberland, Md. 21502

[21] Appl. No.: 533,852

[22] Filed: Sep. 19, 1983

[51] Int. Cl.³ .......................... A23D 2/00; A23L 1/237
[52] U.S. Cl. .................................. 426/549; 426/649; 426/806; 426/653
[58] Field of Search ............... 426/649, 583, 806, 804, 426/653, 549

[56] References Cited

U.S. PATENT DOCUMENTS 4,297,375 10/1981 Shackelford ......................... 426/804
4,309,417 1/1982 Staples ................................. 426/648

FOREIGN PATENT DOCUMENTS 138359 8/1982 Japan .................................... 426/649

*Primary Examiner*—Raymond N. Jones
*Assistant Examiner*—Elizabeth A. Hatcher

[57] ABSTRACT

The present invention relates to new and novel commercially acceptable baked dough products having a reduced sodium ion content and in which no sodium chloride or salt, as it is commonly known, has been added thereto, and yet the baked dough product will have the desired salt taste but will be free of any bitter taste characteristic of most prior salt substitutes. This result is achieved by incorporating in the dough materials prior to the baking thereof as a salt substitute a combination of potassium chloride in an amount which will impart the required salt flavor to the baked dough product and product containing undenatured lactalbumin in an amount sufficient to impart a muting or neutralizing action to the potassium chloride to remove or abate the intense and disagreable bitter flavor normally imparted by potassium chloride when present in baked dough products.

9 Claims, No Drawings

SODIUM-REDUCED BAKED DOUGH PRODUCTS AND METHOD

BACKGROUND OF THE INVENTION

Yeast leavened baked dough products marketed today, as a general rule, normally contain about 500 mg of sodium ion per 100 grams of product. This amount is imparted to the dough products primarily through the addition of sodium chloride to the dough mixture during the making of the dough product. There may be departures from this amount in different products, both up and down, but it can be stated that, in general, baked dough products marketed today contain about 2 parts of sodium chloride or salt per 100 parts of flour or 2% Bakers Percentage of sodium chloride. This amount of salt or sodium chloride has generally been found satisfactory to provide the necessary taste benefits or salty taste that is required for the baked dough products to be salable. Moreover, besides the important flavor function, the salt or sodium chloride also has effects upon the colloidal properties of the dough ingredients during the bread production as well as upon the biological properties such as the fermentation by yeast and the growth or retardation of indigenous organisms. Sodium ions to a small extent are also incorporated in the baked dough products by the flour used as well as other dough additions, such as yeast foods, water, milk, mold inhibitors and virtually every other ingredient employed making up the dough composition. However, to reiterate, the greater amount of the sodium ion present in the baked dough product results from the addition of sodium chloride or salt to the dough during its formulation.

Baked dough products, such as, for example, bread, which are made without sodium chloride or salt are not new. Such baked dough products are commonly produced throughout the country by bakeries as a specialty item for a limited clientele which, for medical reasons, is required to be on salt-free or salt-restricted diets. Such bakeries can, by modifying the dough-making procedures, produce attractive appearing baked dough products as well as overcoming the technical functions of the sodium chloride or salt in the dough production. However, the bakeries in producing salt-free baked dough products have not been able to satisfactorily solve the seasoning or salt taste requirements essential for such baked dough products. Baked dough products without the salt flavor or taste are tastelessly bland and would be totally unacceptable to the average consumers.

It is also a recognized fact that consumers, customarily as a general rule, by their eating habits, ingest a far greater amount of sodium ions, largely as sodium chloride or salt, than is necessary to meet physiological needs or requirements from a health standpoint. As a result of this excessive and unnecessary consumption of the sodium ions by the average individual, many health problems to an individual have been created. For example, it has been reported that excessive consumption of sodium ions is a factor in the causation of intrinsic hypertension. Since baked dough products such as bread are consumed by virtually all individuals as a part of their daily diet, it would therefore be highly desirable for medical and health reasons to provide baked dough products that possessed a material reduction in the amount of sodium ions present therein.

Over the years and continuing to the present time, considerable time, effort and money has been expended to produce a material that would function as a substitute for sodium chloride or salt that could be employed with or in food products and which would satisfy the saline taste requirements of the food and yet impart no bad taste or after-taste to the food and at the same time reduce the sodium ion content. A great deal of such prior activity has been devoted to the production of a salt substitute product adapted to be applied to the food from a salt shaker just prior to consuming same. Such prior products proposed as a substitute for sodium chloride or salt, to a great extent, have been based on the use of potassium chloride as a complete or partial substitute for sodium chloride or in combination with other compounds. Also, other chlorides, such as, for example, choline chloride, ammonium chloride, calcium chloride, magnesium chloride, and the like, usually in combination with other compounds, have also been proposed and tried as a substitute for sodium chloride. Illustrative of prior efforts made heretofore to produce sodium chloride or salt substitutes are the following patents, such patents being basically shaker-adapted products for direct application to foods or for use in treating meats. Such patents are U.S. Pat. No. Re. 27,981; U.S. Pat. Nos. 1,874,055; 2,471,144; 2,500,919; 2,601,112; 2,742,366; 2,806,793; 2,824,008; 2,829,056; 2,910,369; 2,966,416; 2,968,566; 3,104,171; 3,272,593; 3,306,753; 3,447,932; 3,505,082; 3,514,296; 3,524,747; 3,775,543; 3,782,974; 3,782,975; 3,860,732; 4,066,793; 4,066,799; 4,068,006; 4,216,244; 4,243,691; and 4,340,618.

While many of such prior attempts heretofore proposed may produce salt or sodium chloride substitutes which may function satisfactorily to some degree in shaker-type salt seasonings and perhaps in other food such as meats, such salt substitutes have been found to be totally unsatisfactory when employed as an additive compound in producing baked dough products.

It has been found that when prior salt substitutes of the type hereinbefore mentioned were employed in the making of baked dough products, such products were totally unsatisfactory. For example, the use of the chlorides other than sodium, alone or in various combinations, at the necessary minimum amount of about 1.5% bakers percentage required to give the baked dough produced a salt-like taste, invariably imparted to the baked dough product a bitter and thoroughly disagreeable taste as well as an objectionable after-taste. As a result, up to the present time, there has not been a completely satisfactory material available for use as a sodium chloride or salt substitute in the making of baked dough products in which the baked dough product will have a completely satisfactory salt taste and, at the same time, will have no bitter or otherwise objectionable taste or after-taste.

Further, with respect to baked dough product, such as, for example, bread, it is an accepted fact that the sodium ion content present in the bread is primarily imparted thereto by the sodium chloride or salt added during the bread making procedure. However, it is also a known fact that sodium ions, although low in concentration, are also present in many other ingredients employed as additives or components of the ultimately produced bread. Such additional sodium ions are not in chloride form and cannot be practically removed from the dough composition. As a result, a sodium-free baked dough product is, for all practical purposes, a commercial impossibility. This has led the United States Food and Drug Administration to define a bread product which has a sodium ion concentration of 75% less than the sodium ion concentration of normal bread, i.e., less than 125 mg/100 gms., as "sodium-reduced" bread. Thus, to this end, the present invention is directed to the production of "sodium-reduced" baked dough products such as bread. However, it is essential in the production of baked dough products having a reduced sodium content that such baked dough products must also possess a saltiness taste comparable to the salty taste possessed by baked dough products containing sodium chloride.

SUMMARY OF THE INVENTION

In the development of the present invention to produce baked dough products having a reduced sodium content and an acceptable salt taste, it was thought necessary to determine the exact source of the saltiness-imparting properties of various compounds under consideration. It was also thought desirable to determine the degree of saltiness possessed by such compounds. To this end solutions of equal molarity were prepared using the chlorides of sodium, potassium, ammonium, calcium, magnesium and choline. Each of the solutions were thereafter organoleptically tested. It was readily detected that each of the solutions had a salty taste which was mostly detected on the tongue. Each of the solutions, with the exception of the sodium solution, was determined to have a decidedly bitter or metallic taste which would be completely unacceptable to most people if present in foods. Such objectionable tastes were detected on the tongue but also at its rear and elsewhere in the mouth as an aftertaste. The conclusion reached by such tests was that the desired salt taste or flavor was due basically to the chloride cation.

To determine whether the saltiness could be due, at least in part, to the sodium ions, a solution of sodium acetate was prepared in the same manner as above discussed and was tested and found to have virtually no flavor by the panel of tasters. This fact would indicate that the chloride ion alone impinges on the taste buds mostly on the tongue to impart the salt flavor. Sodium ion is present in normal saliva at a level of about 65 mg/100 gms and thus any taste buds solely for tasting sodium ion are believed to be permanently saturated. It was found that at least none of the taste buds were stimulated by relatively high levels of sodium ions along with acetate ion. As a result of such tests it was determined that the saltiness characteristics were imparted by the chloride cations. Thus, any substitute for sodium chloride or salt should, of necessity, be a chloride compound.

With respect to the degree of saltiness possessed by the compounds considered, it was determined that of the available materials tested, potassium chloride was the best available compound to be employed as a substitute for sodium chloride or salt in the production of baked dough products. However, as hereinbefore indicated, potassium chloride imparts a bitter taste to all food products when incorporated therein. Thus, unless the bitter taste inherent with potassium chloride present at any level can be muted or otherwise neutralized, any food products containing potassium chloride as a salt or sodium chloride substitute would not be acceptable to any degree by consumers.

Thus, to achieve a baked dough product that would be free of added sodium ions as well as impart the required salt taste to the bread, the research activity to this end should be directed to the utilization of potassium chloride in combination with a compound or compounds that would mute, abate or otherwise neutralize the bitter taste inherent in the use of potassium chloride in foodstuffs and particularly in baked dough products. Bake tests were made using potassium chloride at various levels to establish a level that would provide a sufficient if not optimum salt taste in the baked dough product. The amount of potassium chloride decided upon by such tests was 1.5% bakers percentage. This level of usage, in fact all useful levels, were found to impart a bitter taste to the dough product and would be obviously rejected by any consumer.

In the course of considering ingredients employed in the production of baked dough products, it was noted that 100 grams of dried sweet dairy whey contained 1100 mg of sodium and 2100 mg of potassium naturally. Though obviously not present all in chloride form, these quantities of sodium and potassium translated to chloride amounts of 4.0% of potassium chloride and 2.8% of sodium chloride. If not in chloride form, sodium chloride, according to previous experiments, would not taste salty, but the presence of the potassium ions in any form would result in a bitter taste. However, it was found that dried sweet dairy whey tastes somewhat sweet without any trace of the expected or predicted bitterness. Thus, it was discovered that the dairy whey obviously possessed a potent natural muting agent for abating or neutralizing the bitter taste inherent with the presence of potassium ions.

Dry dairy whey is a product that has been employed heretofore in the production of baked dough products, such as, for example, bread. Such whey has usually been combined with soy flour or isolated soy protein up to a maximum content of about 3%. The function of the diary whey in breadmaking heretofore has been as an aid in holding dough water and in enhancing crust color development during the baking stage. The dry dairy whey previously employed in dough making have the protein present therein pretty thoroughly denatured by processing. However, the functions of the whey heretofore has depended upon some soluble proteins and high lactose level. Since the lactose is poorly fermented during the dough processing, it is available for carmelization and browning in the bread crust. The dried dairy whey is a cost effective replacement in dough making for defatted dry milk.

Tests were undertaken with respect to combining dairy whey with potassium chloride to determine if it would be possible to mute or abate the inherent bitterness of potassium chloride when present in baked dough products. Using 1.5% potassium chloride which had been determined heretofore as being a satisfactory and acceptable amount for bread, a series of bread formulations were made, each having 1.5% potassium chloride present and with increasing amounts of dairy whey to a level such that the baked product had no bitter taste. It was found that at a usage level of about 15% Bakers Percentage, the bread had no bitter taste and had an acceptable salty taste.

Thus, dry dairy whey has been found, in accordance with the present invention, to be a material, when incorporated at a high level with a dough composition containing potassium chloride as the salt-taste imparting ingredient, will mute the bitter taste of the potassium chloride and will result in a baked dough product having an acceptable salty taste with no bitter taste. The preferred dry milk whey to be employed in the practice of the present invention is a low heat-treated, dry, sweet dairy whey, a typical analysis of such a material being as follows:

Protein: 12.5%
Moisture: 4.5%
Carbohydrate: 73%
Fat: 1.2%
Ash: 8.0%

The carbohydrate in the whey is essentially lactose, a sugar which is not readily fermented by yeast. Bake tests using increments of pure lactose up to 10% and flavored with 1.5% potassium chloride established that the lactose was not the agent muting or removing the bitter aftertaste of the potassium ion. The whey component that is believed to be responsible for eliminating the bitter taste of the potassium chloride appears to be undenatured lactalbumin present as the protein.

With respect to the milk whey that may be employed in the practice of the present invention, any milk whey may be used that possesses a level of lactalbumin that will satisfactorily mute the bitter taste of the potassium chloride at the level used.

It will be further noted that lactalbumin can be obtained in forms other than simply sweet dairy whey. The normal spray dried dairy whey has a lactalbumin content of around 12-13%. This can be raised about 20% by reducing volume and crystallizing out part of the lactose. This product has the full amount of salts remaining. A 34% protein product with reduced lactose and reduced salts, both sodium and potassium, may be manufactured by ultrafiltration followed by spray drying. A 55% protein whey produce may be prepared by demineralizing and transport depletion and dialysis. Moreover, in all cases, the lactalbumin should be native, that is, undenatured. Thus, dry dairy whey having different levels of lactalbumin are readily available commercially and thus any dry dairy whey having a lactalbumin concentration in the range of 12% to 55% may be employed in the practice of the present invention. Similarly, it is also to be clearly understood that it is within the scope and spirit of the present invention that any compound that is otherwise acceptable in the production of baked dough products and which contains a lactalbumin content within the aforementioned range may be employed equally as well.

While at a concentration of 1.5% of potassium chloride, 15% of dry dairy whey will be found to be effective. However, if a lesser amount of potassium chloride is employed, a lesser amount of dairy whey than 15% may be employed. Conversely, if a greater amount of potassium chloride is employed in the baked dough product, a greater amount of dairy whey will be required. Similarly, if a dairy whey is used that possesses a higher level of undenatured lactalbumin, a lesser amount of the whey may be employed to achieve the desired general muting action of the potassium chloride. In general, it will be found in the practice of the present invention the dough composition may contain from about 1.0%-2.25% potassium chloride and from about 10% to 20% dry dairy whey.

The potassium chloride and the dry dairy whey or other lactalbumin-bearing compound will be added during the conventional dough making operation in a manner similar to the incorporation of any other conventional ingredient used in making the baked dough product. The present invention, while primarily concerned with the making of baked bread, it is to be clearly understood that the term "baked dough product" as herein employed is intended to cover any product in which flour is employed along with other ingredient to produce a dough mass which, after further processing, is shaped and thereafter baked. Such baked products would be thus bread, rolls, muffins, and similar products. The baked product that may be produced in accordance with the present invention may then be characterized as any baked dough product in which sodium chloride has been employed heretofore to impart a salt-taste to the product.

The baked dough product resulting from the present invention differs somewhat from the dough products produced heretofore which contain sodium chloride as the salt-taste imparting agent. The odor of the baked dough products will be found to be characterized as "rich" with the flavor being somewhat richer and sweeter than the normal baked products containing sodium chloride. The internal appearance of the baked product is that of a high quality commercial product as judged by texture, grain and general appearance. The loaf symmetry in the case of bread will be found to be normal with the crust color being somewhat darker.

Broadly stated, the present invention comprises the incorporation of 1%–2.25% of potassium chloride and 10–20% of a lactalbumin-containing compound in a dough composition free of added sodium chloride and suitable for the production of a baked dough product, processing the dough composition in a conventional manner and thereafter baking the processed dough product to produce a baked dough product free of added sodium chloride and which will have an acceptable salty taste with no bitter aftertaste being present.

The present invention includes the method of producing the baked dough product as well as the baked dough product itself.

PREFERRED EMBODIMENTS OF THE INVENTION

While the present invention can be utilized with any baking process to produce a commercially acceptable salt-free baked dough product, the majority of commercial bakers employ the conventional so-called sponge and dough process, and in the following example such a procedure will be employed to illustrate the present invention.

EXAMPLE A

A sponge formulation was put together in a mixer having the following ingredients. This procedure has been applied to dough based on as little as 700 grams of flour and as much as 600 pounds.

| Sponge Formulation | |
| --- | --- |
| Ingredient | Parts by Wt. |
| Patent Flour | 70 |
| Dry Whey (Land 'O Lakes - Extra Grade Sweet Dairy Whey) | 15 |
| Potassium Chloride (Food Grade) | 1.5 |
| Cellulose Gum (Dow Chemical-Methocel K4M) | 1.0 |
| Monoglyceride (Patco Products-Starplex 90) | .5 |
| Calcium Propionate (J.F. Short-Mycoban) | .25 |
| Butyric Acid (Food Grade) | .03 |
| Potassium Bromate (2% in CaSO4) | .50 |
| Shortening (Procter & Gamble-Crisco) | 4.0 |
| Compressed Yeast | 4.0 |
| Water | 40.0 |

These ingredients making up the sponge formulation were mixed to obtain a smooth coherent uniform mass and thereafter transferred to a fermentation trough at about 78° F. and allowed to ferment for four hours. This particular sponge contains components not normally used in the sponge for conventional bread but the formula given is one that has been thoroughly tested and has been found to be completely satisfactory. After fermentation, the sponge was returned to the mixer along with the dough ingredients and thereafter mixed to provide an optimum dough composition. The following ingredients were added at this doughing stage to constitute the dough formulation.

| Dough Formulation | |
|---|---|
| Ingredient | Parts by Wt. |
| Patent flour | 30 |
| Sugar | 3 |
| Water (Variable) | 23 |

The dough formulation after being thoroughly mixed with the sponge formulation was taken from the dough mixer at about 80° F. and given a floor time of about 15 minutes. The dough mass was then divided into individual dough pieces and then given about 5 minutes of overhead proof. The dough pieces were then sheeted, molded and panned. The pan proof was carried out at about one hour at 115° F. and at high humidity. The proofed loaves were then baked at about 425° F. for 16–18 minutes. After cooling for about one hour, the baked loaves were sliced and bagged for distribution.

The fresh dairy whey employed in this example contained about 7% solids with the 15% whey solids yielding about 214 parts of reconstituted whey. It is obvious that the whey in this example reconstituted would be concentrated by a factor of at least three. This would be a very high level and is the most cost effective source of lactalbumin.

The cellulose gum (Methocel K4M) was present to provide for a dryer sponge and later a more workable dough. In part it compensates for the gluten tightening action lost by the elimination of sodium chloride. The monoglyceride is a super shortening which retards the swelling of starch in baking and thus helps to maintain a higher free water level in the finished bread. The calcium propionate is a standard mould inhibitor. All the other components in the sponge are standard conventional ingredients except the butyric acid. The larger amount of dairy whey gives the baked formulation loaf a definite "dairy" flavor. The trace of butyric acid added a butter note to the loaf and enhances and improves its flavor.

In the processing of this novel backed break product, only one departure from conventional baking processing need be mentioned. The high level of dairy whey present in the formulation makes for a rapid and rather extreme browning of the dough crust. The baking time and temperatures thereafter should be watched carefully and reduced as required.

The bread produced in this example was judged and found to be of high commercial quality internally as judged by texture, grain, and general appearance. The loaf symmetry was found to be normal and had a dark crust. The odor was found to be normal but "rich". The flavor of the baked bread was found to be generally normal to sweet and rich in taste.

The bread would be commercially acceptable and had no bitterness due to the potassium ion present.

The bread made as just described in this example was assayed chemically with the following results being obtained:

Moisture: 33.84%
Ash: 2.05%
Protein: 8.76%
Crude Fiber: 0.22%
Fat: 4.10%
Carbohydrate: 51.03% (by difference)
Sodium: 8.4 mg/100 gms.
Potassium: 695 mg/100 mg.

This assay indicates significant differences from normal bread in three aspects. The moisture was low which reflects accomodation to the absence of the colloidal effects of salt on the ingredients. The sodium was very low and the potassium level was very high. For normal white bread, the moisture would be about 36%, the sodium content about 500 mg/100 gms and the potassium content would be about 100 mg/100 gms.

TEST DATA

The following tests were undertaken to establish the novel aspects of the present invention and to determine the parameters thereof.

EXAMPLE 1

A bake test using a white bread formula was conducted to determine the level of potassium chloride required to give a satisfactory degree of saline taste. This evaluation of the degree of saltiness was done organoleptically while trying to discount the bitter aftertaste due to the excess potassium ions. The sponge and dough procedure of bread making was employed using test baking procedures based upon 700 grams of total flour. Bakers use percentage in their formulations for parts by weight of the ingredients based upon 100 parts by weight of flour. This Bakers Percentage or BP was employed for all formula ingredients. The sponge formula for this series of bakes wherein the sponge flour is 70% of the total flour in the formula is as follows:

| Sponge Formulation | |
|---|---|
| Ingredient | Bakers Percentage |
| Patent Flour | 70 |
| Water | 45 |
| Yeast | 3 |
| Potassium Bromate (2% diluted with CaSO4) | .5 (14.3 ppm of flour) |

The sponge components were mixed in an Hobart mixer fitted with a MacDuffey bowl and fork for ½ minute in low speed and 3 minutes in 2nd speed. Bowl Jacket and sponge water temperature were controlled so that the sponge from the mixer was maintained at 80±1° F. The sponge was fermented for four hours at 80° F. and 90% relative humidity in a plastic trough after which it was returned to the mixer bowl which contained the dough ingredients below:

| Dough Formulation | |
|---|---|
| Ingredient | BP |
| Patent Flour | 30 |
| Dry Skim Milk | 2 |
| Salt (In Control Dough) | 2 |
| Potassium Chloride (in lieu of salt) | 0-2 |

-continued

| Dough Formulation | |
|---|---|
| Ingredient | BP |
| Sugar | 3 |
| Shortening (vegetable) | 3 |
| Water | 18 |

The doughs were mixed for two minutes at low speed then in second speed until optimally mixed by subjective evaluation. This latter time was five minutes for the dough containing sodium chloride and 3.5 minutes for the other dough containing potassium chloride in lieu of salt. There were four dough pieces containing 0; 1; 1.5 and 2% potassium chloride (Bakers Percentage). The doughs were taken from the mixer at 80±1° F. The dough pieces were thereafter given 15 minutes floor time, were scaled at 500 grams, allowed to rest (overhead time) for five minutes and were then sheeted twice, at 5/16" and 7/32", molded, panned and proofed at 112° F. and 90% RH to a volume of ¾" above the pan lip. Duplicate loaves were made from each dough piece.

The proofed loaves were baked at 425° F. for 21 minutes to acquire the proper crust caramelization. The loaves were then cooled, sliced, sacked in plastic bags and stored at room temperature from 12-24 hours and then evaluated. The physical aspects of the loaf's interior was noted as a quality score, this being a numerical score, subjective in nature, covering such aspects as symmetry, grain, and texture. In such scoring, the average commercial wholesale bakery bread would score 85, while bread scoring above 80 would be salable with bread scoring above 90 being unusually good.

The principle evaluation of test loaves were directed at flavor and more particularly to the saline or salt-flavor and to any off-flavors or objectionable flavors introduced by potassium chloride and other additives. The group of organoleptic testers were asked to evaluate flavor in terms of salt or saline flavor and aftertaste or bitterness on a scale of 0 to 4 for each; a 4 score would be the maximum intensity established by this example. The testers were also asked for additional comments related to this taste testing.

The result of the bread evaluation of this Example by the testers are summarized in the following table:

TABLE I

| Sample # | Ingredient Variables | Quality Scores | Saltiness Rating | Bitterness Rating | Comments on Flavor |
|---|---|---|---|---|---|
| 1 | 2% NaCl | 85 | 4. | 0 | Bland |
| 2 | 0 KCl | 84 | 0 | 0 | Poor-Bad |
| 3 | 1% KCl | 84 | 1 | 0 | Bland |
| 4 | 1½% KCl | 85 | 3.4 | 2.4 | Bitter |
| 5 | 2% KCl | 85 | 3.8 | 4.0 | Bitter-Bad |

It was felt that a saltiness rating of 3 would be generally acceptable although possibly a bit bland to some consumers. It was noteworthy that the 1% of potassium chloride was below the taste threshold of potassium ion or absorbed in some way by the bread ingredients so that its bitterness went unnoted. This is believed to correspond with prior reports in the scientific literature that acceptably flavored bread can be made using 1% sodium chloride and 1% potassium chloride. However, this latter product would result in only a partial reduction in the sodium ion content which would be contrary to the objectives of the present invention.

EXAMPLE 2

To determine the levels at which the dried dairy whey would most effectively abate the bitter taste imparted by the potassium chloride, a bake test series was set up using the general procedure set forth in Example 1, but with the level of the potassium chloride being maintained at a level of 1.5% and the amount of low heat Dried Sweet Dairy whey being varied from 0–20% BP. Both of these ingredients were added in the sponge to provide the maximum time for any interaction to occur.

The sweet dairy whey employed in this test was obtained from Land-O-Lakes, Inc., Eau Claire, Wis. and had the following analysis:

| Extra Grade Sweet Dairy Whey | |
|---|---|
| Protein | 12.5% |
| Lactose | 72.0% |
| Ash | 7.8% |
| Fat | 1.2% |
| Moisture | 4.5% |
| Sodium Ion | 1079 mg/100 gm. |
| Potassium Ion | 2080 mg/100 gm. |

The sponge formulations employed in this test were as follows:

| Sponge | |
|---|---|
| Ingredient | BP |
| Patent Flour | 70 |
| Water (Variable) | 45–39 |
| Yeast | 4 |
| Potassium Bromate (2% diluted with CaSO4) | .5 |
| Potassium Chloride | 1.5 |
| Dry Sweet Dairy Whey | 0–20 |

The only notable thing about the sponge formulations were that the sponge absorption had to be reduced in steps from 45% to 39% with increases in whey solids.

After four hours of fermentation, the dough formulations were prepared and processed as in Example 1. The dough formula in each test was as follows:

| Dough | |
|---|---|
| Ingredient | Bakers Percentage |
| Patent Flour | 30 |
| Sugar | 5 |
| Shortening | 4 |
| Water | 18 |

Each of the dough formulations were shaped as bread loaves and the loaves were baked as described in Example 1, but only for a period of 20 minutes. The loaves were found to be bold and full volumed. There was a progressive increase in crust color with increase in the lactose content. This browning effect was expected since this is a prime function of dairy ingredients in the baked dough products. The loaves were sliced, sacked and held overnight and were thereafter subjected to evaluation with the results thereof being summarized in Table II.

TABLE II

| Sample # | Ingredient Variable-Dairy Whey-12.5% Protein | Quality Score | Saltiness Rating | Bitterness Rating | Comments on Flavor |
|---|---|---|---|---|---|
| 1 | 0% | 85 | 3.4 | 2.5 | Very Bitter Aftertaste |
| 2 | 5% | 85 | 3.6 | 1.5 | Bitter-Bad |
| 3 | 10% | 84 | 3.6 | .5 | Good Bread |
| 4 | 15% | 87 | 3.5 | 0 | Good-Rich Sweet |
| 5 | 20% | 86 | 3.6 | 0 | Slightly Bland Rich-Sweet-Dairy Flavor |

Test #1, without any whey solids, had the same characteristic flavor as Test #4 in Example 1. It was relatively well flavored as far as salinity was concerned. The loaf was found to possess the same objectionable bitter aftertaste. It was found that increasing the amount of the dried dairy whey reduced the bitter taste of the bread so that between concentration of 10% and 15% of the whey levels the bitter taste had disappeared. The three highest levels were virtually free of bitterness and were considered by tasters to be sweet or to have a "rich" or "dairy" flavor which they liked.

EXAMPLE 3

Test results have indicated as noted hereinbefore that the ions of potassium chloride in baked products each produces its own flavor sensations. The chloride ions contribute a desired saline flavor while the potassium ion causes a undesirable bitter aftertaste. A level of 1.5% provides acceptable salinity and the potassium ion flavor is ameliorated or abated by the use of a high level, 10–20%, of low heat dry sweet dairy whey. The whey solids contain about 12.5% protein primarily lactalbumin, 72% lactose and 7.8% ash which are possibly half potassium salts. It is unlikely that this ash could have any salutary effects of flavor. It was considered possible that the effects noted could be due to either the whey protein, the whey carbohydrates or the combination as present.

To determine the possible source of the taste abating characteristic, refined lactose was obtained from Bonguards Creameries, Bonguards, Minn. This material was thereafter substituted for the dry dairy whey at levels of 0, 5, 10, and 15% based on the flour using the bake test procedure of Example 2. The sponge absorption reduction was not needed as was the case with dairy whey. The finished baked bread loaves had an increasing browning color again as a result of the increasing lactose content but otherwise the loaves were very similar in quality.

The breads were submitted to the taste panel as before with the results being in Table III.

TABLE III

| Sample # | Ingredient Variable Purified Luctose | Quality Score | Saltiness Rating | Bitterness Rating | Comments |
|---|---|---|---|---|---|
| 1 | 0% | 85 | 3.4 | 2.5 | Bitter |
| 2 | 5% | 85 | 3.5 | 2.5 | Bitter |
| 3 | 10% | 86 | 3.5 | 2.4 | Bitter/Sweet |
| 4 | 15% | 85 | 3.4 | 2.5 | Bitter/Sweet "off" |

It is apparent that lactose alone does not have the beneficial flavor effects that the dairy whey had in Example 2, but did contribute a definite touch of sweetness to the bread. It is therefore obvious that the desirable muting effects of the dairy whey is due to the protein present as lactalbumin or the combination of the lactalbumin with lactose.

EXAMPLE 4

There is presently not available any practical method for removing all of the components besides lactalbumin from sweet dairy whey. Such would be necessary to unequivocally establish that lactalbumin is the factor in dairy whey solids that is responsible for reducing bitterness baked products caused by potassium chloride and eliminate lactose totally as a functioning agent. There are, however, concentrates of dry sweet dairy whey in which there is a partial removal of other components. One such material is manufactured by Land-O-Lakes, Eau Claire, Wis. and called Puritein 20. The product is made basically by removing water from the whey until supersaturation with lactose occurs. The sugar crystallizes and is thereafter separated. The other ratios of the other components are not altered and the resultant whey product is spray dried under low temperature conditions. The following is a typical analysis:

| Puritein 20 Reduced Lactose Whey (50% Lactose) | |
|---|---|
| Protein | 20% |
| Lactose | 54% |
| Ash | 17% |
| Fat | 2% |
| Moisture | 4.4% |
| Sodium Ion | 2196 mg/100 gm |
| Potassium Ion | 3533 mg/100 gm |

Assuming no additional denaturing of protein occurs and that the whey protein is the effective component in the reduction of the potassium ion bitterness then 9.4% of the 20% protein product would be equivalent functionally to 15% of the whole dried whey. This would tend further to deny any attendant function to the lactose in the flavor of the bread insofar as the abating bitterness in the bread is concerned.

The bake testing procedure employed in this test was the same as that described in Example 2 in which the dried whey at 12.5% protein was replaced at four usage levels of the Puritein 20 whey products with 20% protein. The result of scoring and evaluating loaf flavors are summarized in Table IV.

TABLE IV

| Sample # | Variable Ingredient Puritein 20 | Quality Score | Saltiness Rating | Bitterness Rating | Comments |
|---|---|---|---|---|---|
| 1 | 0 | 83 | 3.4 | 2.5 | Bitter |
| 2 | 5 | 84 | 3.5 | 1.0 | Very Slight Bitter |

TABLE IV-continued

| Sample # | Variable Ingredient Puritein 20 | Quality Score | Saltiness Rating | Bitterness Rating | Comments |
|---|---|---|---|---|---|
| 3 | 9.6 | 83 | 3.5 | 0 | Aftertaste Bland/"Sweet" |
| 4 | 12 | 83 | 3.4 | 0 | Bland/Too Sweet |

The above data clearly establishes that in accordance with the present invention a tasteful and commercially acceptable baked product without added salt can be produced using potassium chloride as the source for the desired saline flavor while eliminating the bitterness of the potassium ion by the inclusion of lactalbumin at a suitable and effective level in the baked products formula.

EXAMPLE 5

A whey protein concentrate (Land-O-Lakes Code 28281), prepared by an ultrafiltration technique wherein some lactose and minerals are removed, is available commercially as a spray dried product. It has as denoted from the following analysis approximately the chemical analysis of spray dried skim milk with 34.5% protein.

| Whey Protein Concentrate | |
|---|---|
| Protein | 34.5% |
| Moisture | 3.5% |
| Lactose | 52.0% |
| Fat | 4.0% |
| Ash | 6.0% |
| Sodium | 753 mg/100 gm |
| Potassium | 1453 mg/100 gm |

This whey product was test baked by the procedure set forth in Example 2 with the above whey protein concentrate being used instead of dried sweet dairy whey. The bread was evaluated for quality and for flavor as hereinbefore indicated. Results are presented in Table V.

TABLE V

| No. | Variable % 34.5 Protein Whey | Score | Saltiness | Bitterness | Comments |
|---|---|---|---|---|---|
| 1 | 1% | 86 | 3.2 | 2.2 | Bitter |
| 2 | 2% | 86 | 3.3 | 1.0 | Bitter Aftertaste |
| 3 | 3% | 85 | 3.3 | 1.0 | Bitter Aftertaste |
| 4 | 4% | 86 | 3.3 | .5 | Bland, V. Sl. Aftertaste |
| 5 | 5% | 86 | 3.4 | 0 | Bland |

The above results indicate that the amount of lactalbumin present in the whey is the most important factor in alleviating the bitter aftertaste engendered in baked dough products by potassium ions. The presence of potassium native to the whey product does not appear to be a major factor in bitter flavor or its control. This whey product however, appears to be slightly better for the purpose of muting the aftertaste than the two previously described which had a higher potassium to protein ratio.

EXAMPLE 6

A very highly concentrated whey protein product is on the market in which the lactalbumin is present in a concentration of 55% and is relatively undenatured. This product is prepared by a combination of demineralization and transport depletion or dialysis of the whey by Land-O-Lakes, Inc., Eau Claire, Wisc. This 55% protein whey protein concentrated product has the following analysis.

Protein: 55.5%
Fat: 7.5%
Lactose: 28%
Moisture: 3.0%
Ash: 5.0%
Sodium: 323 mg/100 gm
Potassium: 786 mg/1000 gm This concentrated product, spray dried, was found to be extremely bland in flavor and is soluble. It was contemplated that about 3% Bakers Percentage in baked dough products should mute the bitterness of a 1.5% level of potassium chloride. Accordingly, bake tests were conducted in the same manner as in Example 2 wherein the dried whey was replaced by the levels of the above-identified 55% protein whey concentrate. Concentrates at the levels used with the results being in Table VI below:

TABLE VI

| No. | Variable 55% Protein Whey | Score | Saltiness | Bitterness | Comment |
|---|---|---|---|---|---|
| 1 | 2% | 84 | 3.4 | 2.0 | Some bitterness |
| 2 | 3% | 84 | 3.5 | .5 | Bland, hint of bitterness |
| 3 | 4% | 84 | 3.4 | 0 | Bland |
| 4 | 5% | 84 | 3.3 | 0 | Bland |

The above results clearly establish that tasty baked dough products with an adequate saline flavor, can be produced using the proper combination of normal bakery ingredients, a level of potassium chloride around 1.5 and a whey product contributing 1.5 to 3% of undenatured lactalbumin. The amount of whey product therefore required depends upon its lactalbumin content.

EXAMPLE 7

The taste tests in Example 1 indicated that in a typical bread formula about 1% of potassium chloride could be used without exceeding that threshold at which the cation exhibited its characteristic bitter flavor. Examples 2, 4, 5 and 6 indicated that 1.5% of the potassium-chloride could be used with some level of lactalbumin present in the whey as the protein removed the bitterness engendered in the baked dough product by that extra 0.5% of potassium salt. This 1.5% of potassium salt was judged subjectively to produce a reasonably acceptable though somewhat bland product and did not give an ideal degree of saline flavor. The date as summarized below, indicates that the 0.5% potassium chloride causing bitterness by its presence was muted by approximately 2% of the lactalbumin from four types of dry whey preparations used.

| Example No. | Dry Whey Protein | Suitable Additive Level | Effective Protein Level for ½% KCl |
|---|---|---|---|
| 2 | 12.5% | 15% | 1.88% |
| 4 | 20 | 9.6% | 1.92% |
| 5 | 34.5 | 5% | 1.73% |

-continued

| Example No. | Dry Whey Protein | Suitable Additive Level | Effective Protein Level for ½% KCl |
|---|---|---|---|
| 6 | 55.5 | 4% | 2.22% |

There was no positive indication that the potassium native to the whey products, and quite high in some of them, had any effect in that it neither increased nor decreased the effectiveness of the whey product significantly. This effectiveness could therefore be directed only to the protein or lactalbumin content of the whey product employed.

The present Example was devised to demonstrate that higher saline flavors can be obtained by increasing the potassium chloride in the baked goods formula and removing the incident bitterness by adding the proper whey protein increment. The test baking procedure was the same as described in Example 2 except that potassium chloride was used at various levels as in Example 1 and 55% whey protein concentrate was employed at a level which was calculated to remove the accompanying potential for bitterness. This was taken to be about 4% for each 0.5% of potassium chloride above the threshold of 1%. The 2.55% of potassium chloride employed was calculated to provide the same concentration of saltiness, that is chloride ions, which would be contributed by the normal 2% of sodium chloride that has been normal to bread and other products baked hereafter.

The results of these bake tests including taste testing, are presented in Table VII below.

TABLE VII

| Test No. | Saline | Whey Conc. | Score | Saltiness | Bitterness | Comments |
|---|---|---|---|---|---|---|
| 1 | 1% KCl | 0% | 83 | 1.0 | .5 | V. Sl Aftertaste Bland |
| 2 | 1.5% KCl | 4% | 84 | 3.5 | 0 | Bland |
| 3 | 2.0% KCl | 8% | 85 | 3.8 | 0 | Sl. Bland |
| 4 | 2.55% KCl | 12% | 85 | 4 | 0 | Good bread |
| 5 | 2% NaCl | 0% | 84 | 4 | 0 | Good bread |

The above results thus provide practical limits to this invention. Certainly the bitterness of 0.5% potassium ion above the threshold of about 1% can be removed or abated by the use of a whey product containing about 2% of native lactalbumin and this applies incrementally to the potassium caused bitterness from higher usage levels of the potassium chloride. The limits are about 1–2.55 of potassium chloride and 0–6% of the lactalbumin. This range therefore covers about the minimum and maximum amount of saltiness desired and limits the amount of whey protein to the range indicated. The amount of whey products which can be used are also limited by the effects they have on dough character, i.e., their use causes reductions in absorption and mixing peculiarities difficult to accomodate. The limit for all the varieties evaluated in the baked dough product probably about 15%. Unfortunately concentrating native lactalbumin beyond 55% appears to be economically prohibitive at this time.

The lactose present in the whey products also has a pronounced effect upon the bread or other products in which it is used. It has a sweetening effect in yeast raised products approximating one half that of sucrose. The usual value given in the literature for the sweetness of lactose is 0.27 times that of sucrose; this value is derived by comparing solutions of the two. Apparently, the yeast action in the baked products causes hydrolysis and oxidation of sucrose while having little if any affect upon the lactose.

The other components of the whey products and especially the proteins also contribute to flavor which is rather characteristic of milk products generally. The use of very high levels of whey products as in this invention blunts the bitterness of potassium ion and also contributes its own complement of flavors which make baked products containing them different in flavor and generally this difference in flavor is desirable.

EXAMPLE 8

There are other physiologically acceptable sources of chloride ions readily available for imparting the saline flavor to baked dough products. These compounds are the magnesium, calcium and ammonium chlorides, all of which are generally recognized as safe for food use. The levels of usage of such compounds to yield equivalent levels of chloride ion in baked dough products depends upon the equivalent weight of each. The amount of each compound required to replace 2% (BP) of sodium chloride is shown below.

| Compound | Eq. Wt. | Percentage (BP) | Grams/700 gm flour formula |
|---|---|---|---|
| $CaCl_2$ | 55.5 | 1.90 | 13.3 gm |
| $MgCl_2 \cdot 6H_2O$ | 101.66 | 3.48 | 24.4 gm |
| $NH_4Cl$ | 53.50 | 1.83 | 12.8 gm |

A dough formulation using each of the above compounds in the amount indicated above was prepared and subjected to a bake test in accordance with the procedure set forth in Example 2 given hereinbefore. With respect to the $CaCl_2$, this compound was hygroscopic and was coarse ground in a mortor with a portion of the sponge flour before being added. The whey employed was a 12% concentration of the 55% whey protein concentrate described in Example 6. The bread product with each test were found to be normal in volume and fair in internal character with the crust color varying considerably. The results of the tests are presented in Table VIII hereinafter.

TABLE VIII

| Test No. | Saline | Crust Color | Score | Saltiness | Bitterness | Comment |
|---|---|---|---|---|---|---|
| 1 | $CaCl_2$ | Normal | 82 | 4 | 4 | Very bitter aftertaste |
| 2 | $MgCl_2$ | Dark | 85 | 4 | 4 | Very bitter |
| 3 | $NH_4Cl$ | Very Dark | 84 | 4 | 3 | Foul aftertaste |

The lactalbumin effect on the breads containing equivalent amounts of the chlorides of calcium, magnesium and ammonium was absent. These salts therefore cannot be considered to be alternatives as sources of the chloride ion or substitutes for salt in the production of baked dough products.

Having clearly established that the combination of 1.0% to 2.5% of potassium chloride with 10% to 20% of a compound containing lactalbumin is a new combination and is a completely satisfactory substitute for sodium chloride or salt in the production of baked dough products, it should be clearly pointed out that such a combination may be incorporated in the baked dough product in any manner that sodium chloride has been incorporated. As hereinbefore indicated, the potassium chloride and the lactalbumin-containing compound, i.e., dried milk whey may be added to the dough during its preparation in the same manner as the other ingredients normally used in making dough products which are subsequently baked. However it is to be clearly understood that the potassium chloride and the lactalbumin-imparting agent may be combined together within the hereinbefore stated ranges or ratios and sold in bulk form as a mixture, i.e., a 100 lb. sack, to the bakery. An example of such a marketing form would be a formulation containing in parts by weight 15 of dried milk whey containing 12.5% lactalbumin and 1.5 of potassium chloride. An alternative form of marketing that can be employed is to combine all ingredients normally employed in making any given baked dough product with the exception of the flour, the shortening, the oil and the sugar and market such a mixture in a single package, i.e., a 100 lb. bag mixture. The baker would then add the mixture to the flour along with the shortening, oil and sugar to form the dough mass which after further processing and baking will ultimately form the baked dough product. An example of such a mixture would be the following with the parts given being by weight.

| | |
|---|---|
| Potassium Chloride | 1.5 |
| Dried Dairy Whey | 1.5 |
| Cellulose Gum | 1.0 |
| Monoglyceride | 0.5 |
| Calcium Propionate | 0.25 |
| Butyric Acid | 0.03 |
| Potassium Bromate | 0.50 |

As hereinbefore mentioned the salt substitute composition of the present invention may be employed with any baked dough product made heretofore in which salt or sodium chloride has been added as an ingredient. For example, the baked dough product may be white bread, rye bread, whole wheat bread and the like or bread containing bran, cracked wheat or the like. Moreover while the present invention has been illustrated by the use of the "sponge and dough process" in the making of the baked dough products, it is to be clearly understood that any baked dough product processing procedure that has been employed heretofore in the production of baked dough products may be used in the practice of the present invention.

While there have been described hereinbefore what, at present, are considered to be preferred illustrative embodiments of the present invention, it will be obvious to those skilled in the art that changes and modifications may be made therein without departing from the spirit and scope of the invention. It is therefore to be understood that the examplary embodiments and descriptions given herein are illustrative in character only and are in no way to be considered restrictive of the present invention, the scope of the invention being defined in the appended claims and that all modifications, changes and substitutions that come within the meaning and range of equivalency of the claims are intended to be included therein.

I claim:

1. A salt-substitute composition for use in the production of baked dough products free of added sodium chloride comprising 1.0% to 2.50% of potassium chloride and 10% to 20% of a lactalbumin-containing compound.

2. A salt-substitute composition in accordance with claim 1 wherein the lactalbumin-containing composition is dried dairy whey.

3. A salt-substitute in accordance with claim 2 wherein the dried dairy whey contains a lactalbumin concentration of between 12% to 55%.

4. A salt-substitute composition in accordance with claim 1 wherein the composition comprises 1.5% of potassium chloride and 15% of dried dairy whey.

5. A baked dough product free of added sodium chloride having included therein as a salt substitute the composition of claim 1 in an amount sufficient to impart salt flavor to the baked product.

6. A dough composition for the preparation of baked dough products free of added sodium chloride and having incorporated therein the composition of claim 1 in an amount sufficient to impart flavor to the dough composition.

7. A salt-substitute composition in accordance with claim 1 wherein the composition comprises the following ingredients:

| Compound | Parts By Weight |
|---|---|
| Potassium Chloride | 1.5 |
| Dried Dairy Whey | 1.5 |
| Cellulose Gum | 1.0 |
| Monoglyceride | 0.5 |
| Calcium Propionate | 0.25 |
| Butyric Acid | 0.03 |
| Potassium Bromate | 0.50 |

8. A baked dough product in accordance with claim 4 wherein the baked dough product is bread.

9. The method of producing a baked dough product free of added sodium chloride comprising adding the composition of claim 1 to a dough, said composition being added in an amount sufficient to impart flavor to the baked product, shaping the dough to the desired shape and baking said shaped dough.

* * * * *